(12) United States Patent
Kelly

(10) Patent No.: US 9,440,260 B2
(45) Date of Patent: Sep. 13, 2016

(54) MECHANICAL DEVICES FOR POST-HARVEST PROCESSING OF PLANT MATTER

(71) Applicant: Josh Kelly, Oregon City, OR (US)

(72) Inventor: Josh Kelly, Oregon City, OR (US)

( * ) Notice: Subject to any disclaimer, the term of this patent is extended or adjusted under 35 U.S.C. 154(b) by 0 days.

(21) Appl. No.: 14/740,682

(22) Filed: Jun. 16, 2015

(65) Prior Publication Data

US 2015/0273527 A1 Oct. 1, 2015

Related U.S. Application Data

(63) Continuation-in-part of application No. 13/665,686, filed on Oct. 31, 2012, now abandoned.

(51) Int. Cl.
| | |
|---|---|
| *A23N 15/00* | (2006.01) |
| *B07B 1/22* | (2006.01) |
| *A23N 11/00* | (2006.01) |
| *A01D 46/02* | (2006.01) |

(52) U.S. Cl.
CPC ............... *B07B 1/22* (2013.01); *A01D 46/02* (2013.01); *A23N 11/00* (2013.01); *A23N 15/00* (2013.01)

(58) Field of Classification Search
CPC ........ A01D 45/10; A01D 46/02; A01G 3/00; A01G 3/08; A01G 17/00; A23N 15/00; A23N 15/02; A23N 15/06; A23N 15/025; A23N 15/12; B26D 3/018; B07B 1/22
USPC ...... 99/636, 639; 241/30, 166, 167, 235, 60, 241/74, 81; 460/78, 134, 135
See application file for complete search history.

(56) References Cited

U.S. PATENT DOCUMENTS

| | | | | |
|---|---|---|---|---|
| 1,358,002 | A * | 11/1920 | Lash | A23N 15/12 83/404.2 |
| 2,642,231 | A * | 6/1953 | Illig | B02C 19/0056 100/157 |
| 3,472,297 | A * | 10/1969 | Urschel | B26D 3/18 83/404.3 |
| 6,892,516 | B1 * | 5/2005 | Ardagna | A01B 1/00 209/421 |
| D591,780 | S * | 5/2009 | Pfaff | D15/147 |
| 8,127,668 | B2 * | 3/2012 | Snyder, Jr. | A23N 15/02 99/636 |
| 8,757,524 | B2 * | 6/2014 | Mosman | A01G 3/08 241/166 |
| 8,910,891 | B2 * | 12/2014 | Sharp | B02C 15/16 241/228 |
| 9,161,566 | B2 * | 10/2015 | Hall | A23N 15/02 |

* cited by examiner

*Primary Examiner* — Robert Pezzuto
(74) *Attorney, Agent, or Firm* — Bert P. Krages, II

(57) ABSTRACT

Mechanical post-harvest processing devices for processing plant material by separating a desired portion of plant material from an undesired portion of plant material are shown and described. The mechanical post-harvest processing devices each include: a saddle having a plant material container-proximate region and one or more saddle openings; a plant material container having one or more plant material container openings and an exterior surface proximate the saddle and circumferentially enclosing a post-harvest processing space; and a rotary actuator mechanically connected to the plant material container and configured to rotationally drive the plant material container such that the plant material chamber rotates within the saddle. In some examples, a portion of the one or more plant material container openings and a portion of the one or more saddle openings overlap at one or more positions during rotation of the plant material chamber.

20 Claims, 7 Drawing Sheets

MECHANICAL DEVICES FOR POST-HARVEST PROCESSING OF PLANT MATTER

CROSS REFERENCE TO RELATED APPLICATIONS

This application is a continuation-in-part of and claims priority to co-pending U.S. patent application Ser. No. 13/665,686, filed on Oct. 31, 2012, which is hereby incorporated by reference for all purposes.

BACKGROUND

The present disclosure relates generally to mechanical post-harvest plant material processing devices for separating and/or fractionating undesirable plant matter (i.e., undesired plant material) from desirable plant matter (i.e., desired plant material). In particular, mechanical post-harvest plant material processing devices that do not require removal and reinsertion of plant material are described. Further, the described mechanical post-harvest plant material processing devices can include interchangeable post-harvest processing features and/or additional or alternative post-harvest processing features adapted to increase efficacy in trimming dry plant material during separation and/or fractionation of undesirable plant matter from desirable plant matter.

Known mechanical post-harvest plant matter processing devices are not entirely satisfactory for the range of applications in which they are employed. For example, many existing devices do not include automatic mechanical features, such as electrically powered motors, which allow plants to be harvested using repetitive mechanical processes with minimal human labor. Further, some conventional post-harvest plant matter processing devices, particularly trimming devices that provide automatic mechanical operation, require plant material to be removed and reintroduced into the trimming device several times to fully separate the desired portion of plant material from the undesired portion of plant material.

For example, many devices include, substantially linear mechanisms that require plant material to be repeatedly sent through a trimming mechanism and output partially fractionated or separated plant material which must be reintroduced multiple times to adequately separate the desired portion of plant material from the undesired portion of plant material. Such systems require a great deal of continuous human attention and labor. Thus, there exists a need for a harvesting mechanism that obviates the need for this reintroduction mechanism through a cyclical and automated process that does not require consistent user intervention.

Additionally, many known mechanical post-harvest plant matter processing devices are not adequately equipped to trim dry plant material. Specifically, many existing devices are unable to retain plant material in a position where it can be processed when dry. Further, many existing devices do not have adequate mechanisms for handling stray particulate matter, which can cause messes and/or create fire hazards.

Moreover, many conventional devices lack adequate detachability and interchangeability of post-harvest processing mechanisms. As a result, many devices are unable to adapt to process disparate plant materials and/or perform disparate post-harvest processing tasks. For example, many devices relating to harvesting plants that produce harvestable buds or flowers, such as hops, are unable to subsequently grind the resultant crop or desired portion of the plant material down to more fine particulate matter, as may be desired. As a result, users are often required to purchase a wholly separate product for grinding plant matter. Thus, to achieve desired results, many conventional systems require users to use two or more separate machines, one for each individual post-harvest processing task. Thus, there exists a need for a device that may be adapted to each of these post-harvest processing tasks.

Thus, there exists a need for mechanical post-harvest plant matter processing devices that improve upon and advance the design of known post-harvest plant matter processing devices. Examples of new and useful mechanical post-harvest plant matter processing devices relevant to the needs existing in the field are discussed below.

SUMMARY

The present disclosure is directed to mechanical post-harvest processing devices for processing plant material by separating a desired portion of plant material from an undesired portion of plant material. The mechanical post-harvest processing devices each include: a saddle having a plant material container-proximate region over a portion of its surface area and one or more saddle openings disposed within the plant material container-proximate region; a plant material container having an exterior surface proximate the saddle over at least a portion of the plant material container-proximate region, the exterior surface circumferentially enclosing a post-harvest processing space, and one or more plant material container openings disposed in a surface of the plant material container; and a rotary actuator mechanically connected to the plant material container, the mechanical actuator configured to rotationally drive the plant material container such that the plant material chamber rotates within the saddle. In some examples, a portion of the one or more plant material container openings and a portion of the one or more saddle openings overlap at one or more positions during rotation of the plant material chamber.

DETAILED DESCRIPTION

Figure 1:
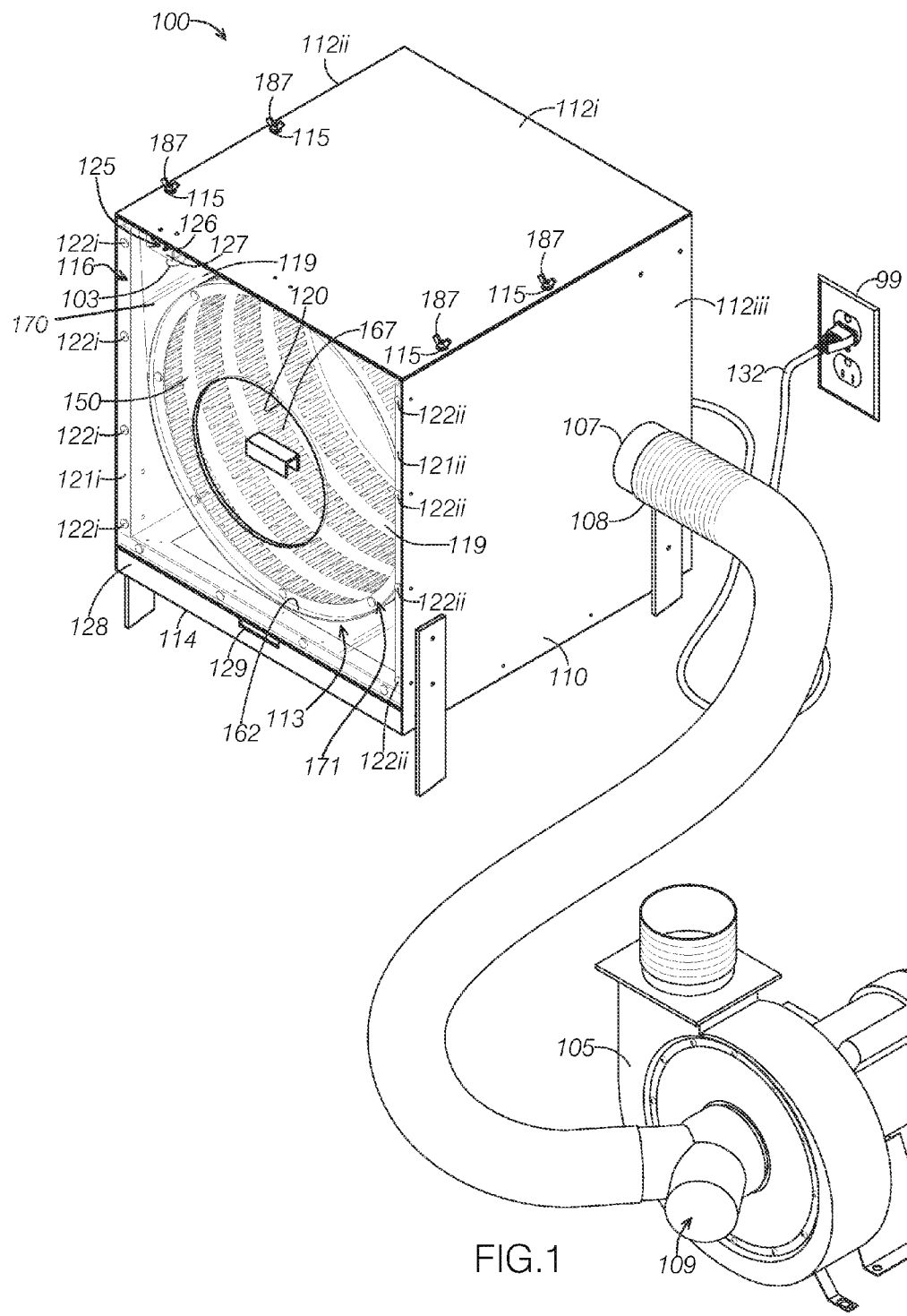
FIG. 1 is a front perspective view of a first example of a mechanical post-harvest plant material processing device.

The disclosed mechanical post-harvest plant matter processing devices will become better understood through review of the following detailed description in conjunction with the figures. The detailed description and figures provide merely examples of the various inventions described herein.

Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various mechanical post-harvest plant matter processing devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-6, a first example of a mechanical post-harvest plant matter processing device, device 100, for separating desired plant material from undesired plant material will now be described. As shown in the figures, device 100 includes a case 110, a motor 130, a plant material container 150 configured to receive plant material, a saddle 170, and a control panel 190.

Device 100 is configured to perform a substantially cyclical post-harvest processing operation, which requires no unloading and/or reintroduction of the plant material to separate and/or fractionate the desired plant material from undesired plant material. Indeed, device 100 allows users to fractionate plant matter without consistent intervention; rather, device 100 can provide users with a one-step post-harvest processing operation. Some examples may also include interchangeable elements that may allow users to modify device 100 to adapt to particular uses. Additionally or alternatively, device 100 includes several features that may increase its effectiveness in trimming dry plant material.

Figure 2:
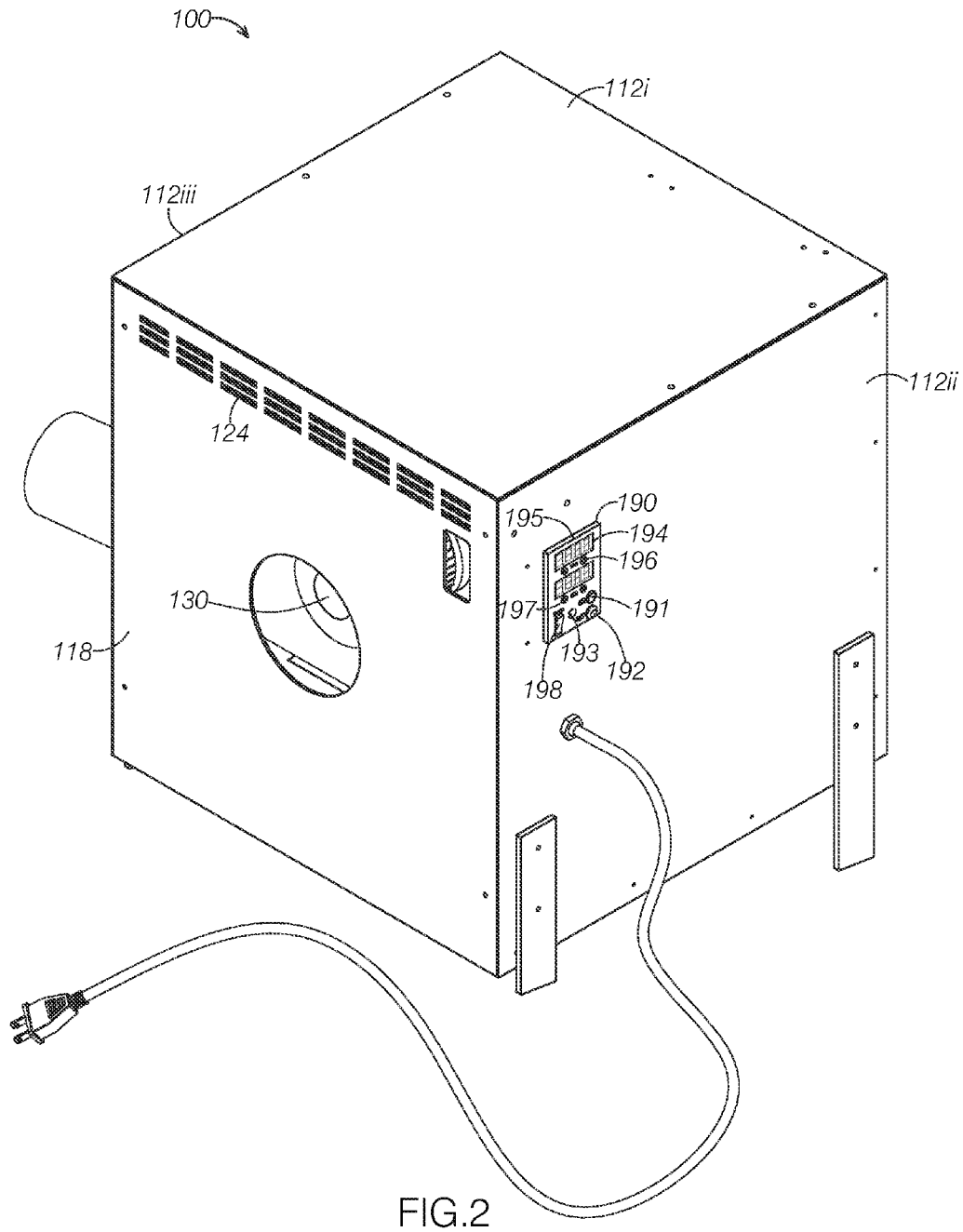
FIG. 2 is a rear perspective view of the mechanical post-harvest plant material processing device shown in FIG. 1.

As shown in FIG. 1, case 110 substantially encloses device 100's operable post-harvest processing structures, including plant material container 150 and saddle 170 disposed in a case interior space 113. Case 110 provides, among other benefits, a barrier that isolates case interior space 113 and prevents materials (e.g., plant material, debris, etc.) from unintentionally entering or exiting the case interior space. Similarly, case 110 provides a safety measure through preventing users from unintentionally contacting device 100's post-harvest processing elements, which could cause injury during operation of the device. Further, case 110 provides structural support to many features of device 100 (e.g., plant material container 150 and saddle 170).

case 110 is comprised of a plurality of panels, including a top panel 112*i*, a first side panel 112*ii*, a second side panel 112*iii*. The plurality of panels can be metallic panels. case 110 is additionally comprised of a bottom portion 114. case 110 defines a substantially open panel 116, through which case 110 may be accessed and/or viewed from case 110's exterior. Case 110 further includes a case access cover 119 disposed within and/or covering open panel 116. As FIG. 2 illustrates, case 110 further includes a rear panel 118 opposing open panel 116. Furthermore, case 110 includes a plurality of legs 111 extended downwardly from bottom portion 114 for supporting device 100 on a surface.

FIGS. 1 and 2 collectively show that each of case 110's panels are attached to one another, such as through corner welds, to give case 110 a shape that substantially resembles a rectangular prism. Specifically, in this example, top panel 112*i* defines a substantially rigid, sheet-metal rectangular panel attached by corner welds to first side panel 112*ii*, second side panel 112*iii*, and rear panel 118. Similarly, first side panel 112*ii* defines a substantially rigid, sheet-metal rectangular panel attached by corner welds to top panel 112*i*, rear panel 118, and bottom portion 114. Further, first side panel 112*ii* includes a first case access cover retainer 121*i* projecting into case interior space 113, having a plurality of second retainer magnetically interactive materials 122*i* facing outward.

Also shown in FIGS. 1 and 2, second side panel 112*iii* defines a substantially rigid, sheet-metal rectangular panel attached by corner welds to top panel 112*i*, rear panel 118, and bottom portion 114, substantially similar to first side panel 112*ii*. Further, second side panel 112*iii* includes a second case access cover retainer 121*ii* having a plurality of second retainer magnetically interactive materials 122*ii*, substantially similar to first side panel 112*ii*.

Second side panel 112*iii* additionally includes a duct opening 107, to which a duct 108 connects case interior space 113 to a disposal area 109, such as an external air vent, to define a substantially enclosed fluid- and solid particulate-transmissive path extending between case interior space 113 and disposal area 109. A fluid pump 105 can be connected to duct 108 to direct air flow from case interior space 113 to disposal area 109. Device 100 is configured to selectively direct fluid and/or particulate matter contained within case interior space 113 through duct 108 to disposal area 109 to reduce the amount of particulate matter contained within case 110 and the amount of particulate matter undesirably given off in the area near device 100.

This may be useful, for example, to reduce the amount of dust produced by device 100 when processing plant material. Further, it may reduce the scent given off by device 100 when processing pungent plants. Other example devices may not include any such structure to connect the device to a disposal area 109. This may be particularly useful, when it is desired to collect particulate matter, such as with hops or other plants that produce harvestable buds or flowers.

Returning to FIG. 2, rear panel 118 is attached to first side panel 112*ii*, second side panel 112*iii*, top panel 112*i*, and bottom portion 114. Unlike top panel 112*i*, first side panel 112*ii*, second side panel 112*iii*, and bottom portion 114, rear panel 118 can include a polymer covering on its exterior surface. rear panel 118 defines a plurality of vents 124 positioned above motor 130 and configured to provide a fluid-transmissive path between case interior space 113 and the exterior of case 110. In other words, vents 124 allow the passage of moisture and/or heat from case interior space 113 to the environment during processing of plant material. When post-harvest processing dry material, vents 124 may help regulate temperature within case interior space 113, thereby reducing the risk of igniting plant particulate matter. By being positioned immediately above motor 130, vents 124 may be particularly efficient in releasing heat produced by motor 130 during operation. When post-harvest processing wet plant material, vents 124 may provide a path through which evaporated moisture may travel.

As FIG. 1 illustrates, open panel 116 defines a void that serves as a case access opening through which a user may insert and/or retrieve plant material plant material container 150. Plant material container 150 is accessible through harvesting container access opening 162 (i.e., a perimeter of plant material container 150). In some examples, open panel 116 may include a rigid, sheet-metal panel, similar to other disclosed panels, over some or all of a portion of its surface rather than completely defining a void. In such examples, open panel 116 may include a case access opening that at least partially overlaps harvesting container access opening 162.

Case 110 additionally includes case access cover 119 removably attached to case 110 to cover a portion of open panel 116. As FIG. 1 shows, case access cover 19 is comprised of a substantially rigid and translucent material, such as a plexiglass material. The rigid and translucent case access cover reduces the likelihood that a user might accidently reach into the device during operation and/or that exterior particulate matter may unintentionally enter case interior space 113, while allowing the user to view post-harvest processing of plant material. This may prevent harm to users and reduce operational wear on the equipment.

Figure 4:
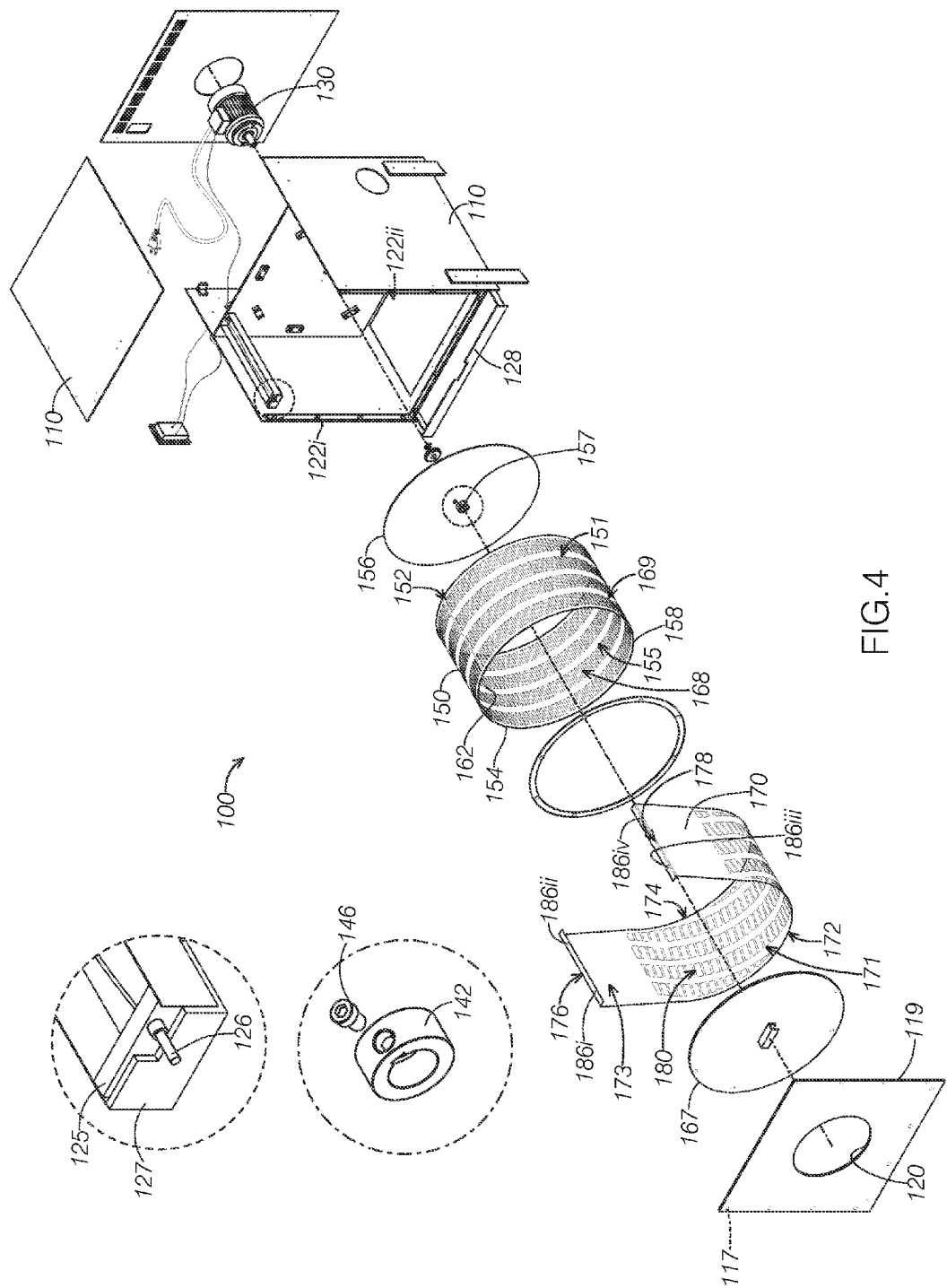
FIG. 4 is an exploded view of the mechanical post-harvest plant material processing device shown in FIG. 1.

As shown in FIGS. 1 and 4, case access cover 119 includes a case cover port 120 substantially centered on case access cover 119. Case cover port 120 allows users to view the contents of plant material container 150 while case access cover 119 provides a meaningful barrier to limit unintentional access of device 100.

As FIG. 4 illustrates, case access cover 119 includes a plurality of case access cover magnetically interactive materials 117 configured to be operatively paired with first retainer magnetically attractable elements 122*i* and second retainer magnetically interactive materials 122*ii*. Accordingly, case access cover magnetically interactive materials 117 are positioned to align with first retainer magnetically attractable elements 122*i* and second retainer magnetically interactive materials 122*ii* when case access cover 119 is in a fitted position in case 110, such as is depicted in FIG. 1.

Figure 3:
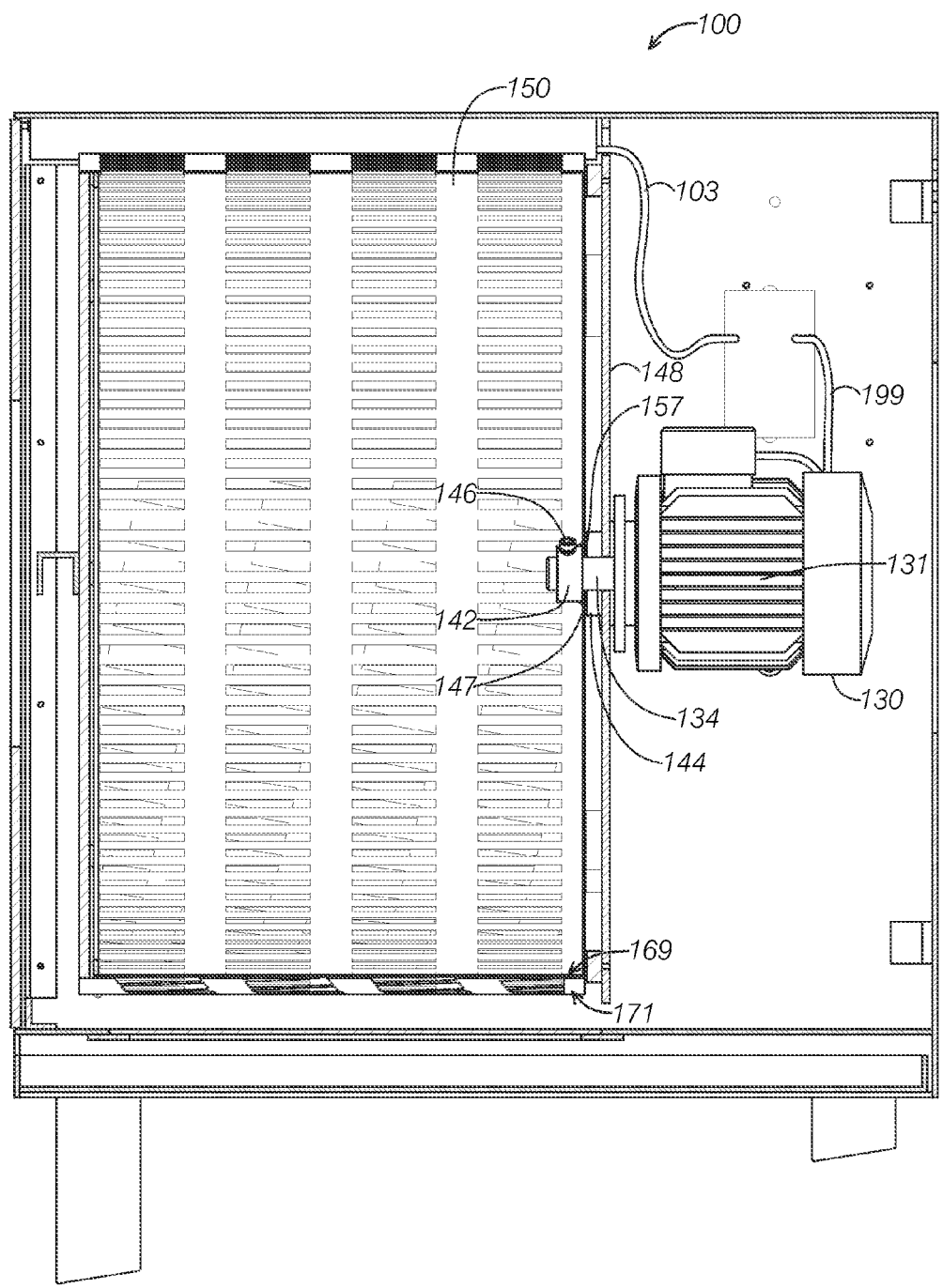
FIG. 3 is a side elevation cutaway view of the mechanical post-harvest plant matter processing device shown in FIG. 1 illustrating a saddle, a plant material container, and a motor.

As FIGS. 1, 3, and 4 illustrate, bottom portion 114 is positioned below case interior space 113, saddle 170, and plant material container 150. Further, bottom portion 114 is attached to first side panel 112*ii*, second side panel 112*iii*, and rear panel 118. bottom portion 114 provides a base for device 100 that is configured to collect fallen particulate matter and/or discarded plant material produced by device 100 during operation.

bottom portion 114 includes a tray 128 slidingly disposed within bottom portion 114 and facing case interior space 113. Tray 128 is positioned to collect the fallen particulate matter and/or discarded plant material produced by device 100 during operation. Tray 128 is configured to slide between an accumulating position where it is substantially fully received within case 110, such as is seen in FIG. 1, and a dispensing position substantially outside the case. FIG. 4 shows tray 128 in a partially removed state (i.e., moved partially towards the dispensing position. tray 128 includes a tray handle 129 that allows a user to move tray 128 between the accumulating position to the dispensing position.

As shown in FIG. 1, case 110 further includes a safety device 125 attached to top panel 112*i* proximal to open panel 116. Safety device 125 is in electric communication with motor 130 via a safety wire 103. Safety device 125 includes a safety control box 127 and an outwardly biased safety device pin 126. Safety device 125 is configured to detect removal of case access cover 119 and is further configured to communicate a signal to the motor to enter an idle state, in other words, to cease operation, in response to removal of case access cover 119. The paired magnetically attractable elements retain case access cover 119 substantially in place when in a fitted position in case 110 until removal by a user.

safety device pin 126 is configured to be pressed from an extended position, where safety device pin 126 is extended out of safety control box 127, to a depressed position, where safety device pin 126 is substantially received by safety control box 127 when case access cover 119 is fitted within open panel 116. When case access cover 119 is removed, safety device pin 126 can return to the extended position due to outward biasing. When safety device pin 126 returns to the extended position, safety control box 127 is configured to communicate the signal to motor 130 to cease operation.

In alternate examples, device 100 may be configured to prevent motor 130 from receiving electrical power unless safety device pin 126 in the depressed state. Similarly to the examples described above, this prevents device 100 from operating without case access cover 119 fitted within open panel 116, such as is seen in FIG. 1. In both examples, safety device pin 126 reduces the likelihood of a user being harmed by unintentionally reaching into case interior space 113 during operation of device 100.

As described above, saddle 170 is positioned within case 110. As FIG. 4 illustrates, saddle 170 is longitudinally extended from a front end 172, proximate open panel 116, to a rear end 174, proximate rear panel 118. Further, saddle 170 has a substantially parabolic profile when viewed along its longitudinal axis. As FIGS. 1 and 4 collectively show, the parabolic shape of saddle 170 is from a first saddle lateral edge 176 to a second saddle lateral edge 178, thereby defining a saddle-interior space 173 bounded by saddle 170 and top panel 112*i*. Additionally, saddle 170 includes a plurality of saddle openings 180.

saddle 170 further defines a harvesting container-proximate region 171, shown in FIGS. 1, 3, and 4, over a portion of saddle 170's surface area. Specifically, harvesting container-proximate region 171 is extended over a lower portion of saddle 170's interior surface area proximate its vertex. Harvesting container-proximate region 171 substantially includes a portion of saddle 170's interior surface area proximate plant material container 150. Furthermore, saddle 170 generally defines a curve within plant material container-proximate region 171. Plant material container 150 is configured to rotate within saddle 170 within plant material container-proximate region 171 and post-harvest processing occurs within plant material container-proximate region 171.

As FIG. 4 illustrates, saddle 170 includes a plurality of saddle attachment points 186*i-iv*, each positioned proximate a saddle lateral edge. Specifically, saddle attachment points 186*i* and 186*ii* are disposed in first saddle lateral edge 176 and saddle attachment points 186*iii* and 186*iv* are disposed in second saddle lateral edge 178.

As FIG. 1 illustrates, a plurality of saddle fasteners 187 are each removably routed through each saddle attachment point and a corresponding saddle fastener receiver 115 on top panel 112*i* to substantially retain saddle 170 in case interior space 113 by attachment to top panel 112*i*. In some examples, the saddle fasteners may define wingnut and bolt combinations, wherein saddle attachment points 186*i-iv* and saddle fastener receivers 115 define holes through which the bolts may be routed and the wingnuts may be fastened either above top panel 112*i* or below saddle attachment points 186*i-iv*. Such configurations may allow saddle 170 to be removed, which may be useful in certain post-harvest processing contexts. For example, this may be useful when using a plant material container defining a fine mesh (described in detail below in reference to FIG. 6).

In some examples, some or all of plant material container 150 is either in contact with or minimally spaced from the inner surface of saddle 170 over some or all of plant material container-proximate region 171. In some examples, the saddle may include a low-friction material (e.g., Teflon or other chemically similar material) applied to its inner surface, which may allow plant material container 150 to be seated within and rotate within saddle 170 with less friction.

The low-friction material can reduce the amount of heat applied to plant material within post-harvest processing space 155, which makes device 100 particularly adaptable to processing dry plant material. Namely, the reduced friction may reduce the risk posed by friction-generated heat ignition of particulate plant material caught between plant material container 150 and saddle 170. Further, reduced friction may reduce operational wear. In some examples, device 100 may process plant material most efficiently by minimizing the space between plant material container 150 and saddle 170. Accordingly, applying the non-friction material to either saddle 170's interior surface or plant material container 150's exterior surface may mitigate any damage for the reasons discussed above.

As FIG. 1 shows, plant material container proximate region 171 is substantially proximate with approximately, but slightly less than, one half of the circumference of plant material container 150. The specific size of the plant material container-proximate region provides a sufficient amount of trimming and/or processing space (e.g., surface area), while reducing the likelihood of friction or stress resisting plant material container 150's rotation within saddle 170. As FIG. 3 shows, plant material container 150 may, in some examples, partially rest in plant material container-proximate region 171.

Because of the reduced surface area, and corresponding reduction in friction, compared to a dual-concentric design, device 100's saddle-and-drum configuration (i.e., plant material container 150 positioned within saddle 170) makes device 100 particularly suited to post-harvest processing of dry plant material. Further, because little to no processing occurs on the upper half of plant material container 150 (i.e., the portion that is upwardly disposed during rotation of the plant material container), device 100 reduces the likelihood of particulate matter inadvertently entering the top half of case 110 (which would, in some examples, pose a fire risk and/or damage equipment).

As depicted in FIGS. 1, 3, and 4, saddle openings 180 are positioned over substantially all of saddle 170's surface, including within plant material container-proximate region 171; as a result, saddle openings 180 collectively define a saddle mesh 182. In the present example, saddle mesh 182 (i.e., saddle openings 180) is a plurality of equally sized, aligned parallelogram (which may be, in some examples, rectangular) openings. As FIG. 5 demonstrates, each saddle opening 180 defines a first saddle opening lateral edge 184 and a second saddle opening lateral edge 185, which are substantially linear and substantially parallel.

Returning to FIG. 3, motor 130 is supported within case 110 proximate rear panel 118 and is mechanically attached to plant material container 150. motor 130 is electrically powered, drawing energy from an external electrical power source, such as a wall outlet 99, through a power cable 132 extended through case 110 (shown in FIG. 1). motor 130 serves as a rotary mechanical actuator, configured convert the received electrical energy by rotationally driving plant material container 150 via a rotary shaft 134.

As FIGS. 3 and 4 illustrate, rotary shaft 134 is configured to operatively pair plant material container 150 with motor 130 by fixedly, but interchangeably, attaching plant material container 150 to rotary shaft 134. Although rotary shaft 134 is round in the depicted example, some examples may include rotary shafts that define a polygonal (or other non-circular) cross-section taken about its longitudinal axis. Such designs may increase the amount of torque the rotary shafts are able to translate to plant material containers.

plant material container 150 is seated within saddle 170 and is operatively connected to motor 130. FIGS. 1 and 4 illustrate that plant material container 150 substantially defines a hollow cylindrical drum having a harvesting container exterior surface 151 circumferentially enclosing post-harvest processing space 155. Accordingly, plant material container 150 and saddle 170 have the saddle-and-drum configuration described above. plant material container 150 defines a curvature 169 that is substantially similar to the curve of plant material container-proximate region 171. As FIG. 4 shows, plant material container 150's perimeter is substantially circular, and, as a result, curvature 169 is substantially uniform (i.e., continuous) around all of plant material container 150's exterior.

As FIG. 3 illustrates, plant material container 150 may be positioned within saddle-interior space 173, substantially aligned with saddle 170's longitudinal axis. When so positioned, some or all of a portion of harvesting container exterior surface 151 may be minimally spaced from or interfacially engaged with saddle 170 over some or all of plant material container-proximate region 171 Further, plant material container 150 is extended from an interior end 152, proximate rear panel 118, to an open end 154, proximate open panel 116.

As shown in FIG. 4, plant material container 150 additionally includes a harvesting container back panel 156 proximate to interior end 152. harvesting container back panel 156 is generally circular and includes a back panel opening 157 substantially located at a center of the back panel. Back panel opening 157 is configured to removably attach plant material container 150 to motor 130. Specifically, back panel opening 157 is sized and shaped as to slidingly receive rotary shaft 134. Plant material container 150 may be mechanically attached to motor 130 by connecting plant material container 150 via routing rotary shaft 134 through back panel opening 157.

As depicted in FIGS. 3 and 4, a fastener may be attached to rotary shaft 134 to retain plant material container 150 in a substantially fixed longitudinal position on rotary shaft 134. In the present example, the fastener includes a collar 142 that is fixedly connected to harvesting container back panel 156 proximate to back panel opening 157 and a bolt 146 configured to be screwingly received by collar 142 toward rotary shaft 134.

Device 100 further includes a fixed backstop 144 that prevents plant material container 150 from sliding beyond a desired position on rotary shaft 134. In the present example, backstop 144 includes a plurality of low-friction backstop pads 147 attached to a backstop panel 148 positioned between plant material container 150 and motor 130. The backstop pads are configured to contact plant material container 150 without substantially restricting its rotation. In some examples, however, backstops may define a metal (or other similarly rigid) radial projection projecting from the rotary shaft between the plant material container and the motor.

To attach plant material container 150 to motor 130, rotary shaft 134 may be slidingly received by back panel opening 157 until harvesting container back panel 156 is substantially fully engaged with backstop 144. When plant material container 150 has fully received rotary shaft 134 such that plant material container 150 is engaged with backstop 144, bolt 146 may be tightened within collar 142 to substantially fix fastener 140 in its longitudinal position on rotary shaft 134. Accordingly, bolt 146 retains plant material container 150 in a substantially fixed radial position on rotary shaft 134 so that it may be rotationally driven by motor 130. In some examples, rotary shaft 134 may include an opening or a longitudinally extended channel to receive bolt 146 in order to retain plant material container 150 in a fixed radial position on rotary shaft 134.

Bolt 146 may, of course, be removed to remove plant material container 150 from rotary shaft 134. Removing bolt 146 may involve, for example, unscrewing it from collar 142. By allowing removal of plant material container 150, device 100 allows additional or alternative examples of drums (i.e., additional or alternative examples of plant material containers) to be attached to rotary shaft 134 and operate similar to plant material container 150. By providing users with interchangeable plant material containers, users are able to selectively exchange drums to adapt device 100 to particular circumstances and/or post-harvest processing procedures.

Opposing plant material back panel 156, plant material container 150 includes a harvesting container access opening 162 facing open panel 116. Users may access post-harvest processing space 155 through harvesting container access opening 162, allowing users to insert un-processed plant material into post-harvest processing space 155 and/or retrieve processed plant material from post-harvest processing space 155.

As FIG. 4 shows, device 100 further includes a substantially rigid, translucent harvesting container access opening cover 167 configured to be attachable to plant material container 150 to cover substantially all of plant material container access opening 162. FIG. 1 shows harvesting container access opening cover 167 attached to plant material container 150 and covering plant material container access opening 162. Harvesting container access opening cover 167 can be made of the same or similar plexiglass material as case access cover 119. Container access opening cover 167's translucency allows users to view post-harvest processing space 155, while its rigidity provides a meaningful barrier preventing unintentional reaching into post-harvest processing space 155 by users during operation of the device.

harvesting container access opening cover 167 includes a handle 166 that allows users the ability to easily insert and remove harvesting container access opening cover 167 from plant material container 150. case cover port 120 is substantially aligned with harvesting container access opening cover 167, providing a single-layer of plexiglass material window for users to look through for viewing post-harvest processing space 155, thereby increasing the visibility of post-harvest processing space 155 as compared to an example with case access cover 119 covering all of open panel 116.

As described above, the saddle may include a low-friction material applied to its inner surface. Additionally or alternatively, plant material container 150 can include a low-friction material applied to harvesting container exterior surface 151, thereby reducing damage and heat that may otherwise result from friction between plant material container 150 and saddle 170. The low friction material on the plant material container exterior surface may reduce the amount of heat generated during use, which may in turn reduce the risk of unintentionally igniting plant material or particulate matter and/or reduce the amount of operational damage to plant material container 150 and/or saddle 170. In some examples, plant material container 150 may be seated and substantially engaged with some or all of plant material container-proximate region 171, whereby the low-friction material reduces the amount of friction created as plant material container 150 rotates. In some examples, the low-friction material is Teflon.

As shown in FIGS. 1-4, similarly to saddle 170, plant material container 150 defines a plurality of harvesting container openings 158 disposed in its surface. Specifically, plant material container 150 includes a plurality of plant material container openings 158 disposed in plant material container 150's surface to define a coarse harvesting container mesh 168. coarse harvesting container mesh 168 (i.e., openings 158) includes a plurality of equally sized, aligned parallelogram (which may be, in some examples, rectangular) openings that cover plant material container 150's surface. As FIG. 5 demonstrates, each plant material container opening 158 defines a first container opening lateral edge 159 and a second container opening lateral edge 160, wherein both of first container opening lateral edge 159 and second container opening lateral edge 160 are substantially linear and substantially parallel.

In alternate examples, either or both of the saddle openings and the plant material container openings, may be circular, other polygonal shapes, or non-polygonal. While there is a set of substantially uniformly shaped and sized openings on both the illustrated saddle and plant material container, this is not specifically required. Accordingly, alternatively or additionally, alternative examples can include openings of differing shapes and sizes in either or both of the saddle openings and the plant material container openings.

The example shown in FIGS. 1-5 illustrates a coarse harvesting container mesh 168 with a screen sized to isolate a desired portion of plant material and retain an undesired portion of plant material, which may include stems and/or leaves. As FIGS. 1-5 show, plant material container 150 defines a coarse screen for plant material container 150's intended use of coarsely processing desired plant material from stems and/or leaves.

Figure 5:
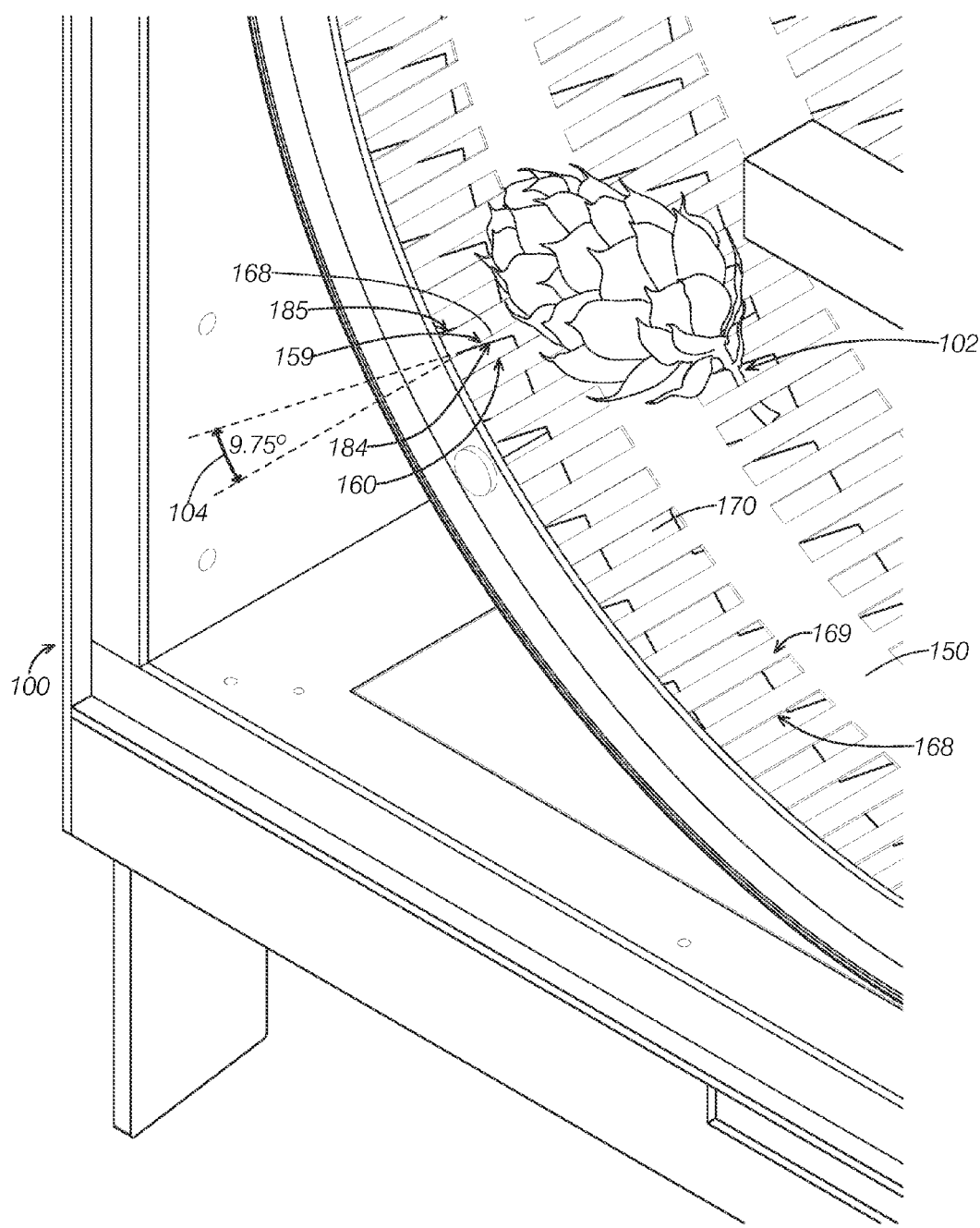
FIG. 5 is perspective, close-up view showing an undesired portion of the plant material partially retained within a plant material container.

As FIG. 5 shows, the coarse mesh is configured to receive, retain, and/or trap at least a portion of the undesired portion of the plant material, which may include leaves and/or stems, as plant material container 150 rotates within saddle 170. The coarse mesh is further configured to retain substantially a majority of the desired portion of the plant material, such as the bud of a hop or other plants that produce harvestable buds or flowers, within post-harvest processing space 155. Thus, the desired portion of the plant material can be separated from the undesired portion of the plant material, remaining loose in the post-harvest processing space and able to be collected by the user. The coarse mesh is not, of course, appropriate for all contexts. Some contexts may require a finer or larger mesh. For example, the mesh may be sized as to receive stems specifically, leaves specifically, and/or be adapted to specific types of plants.

Figure 6:
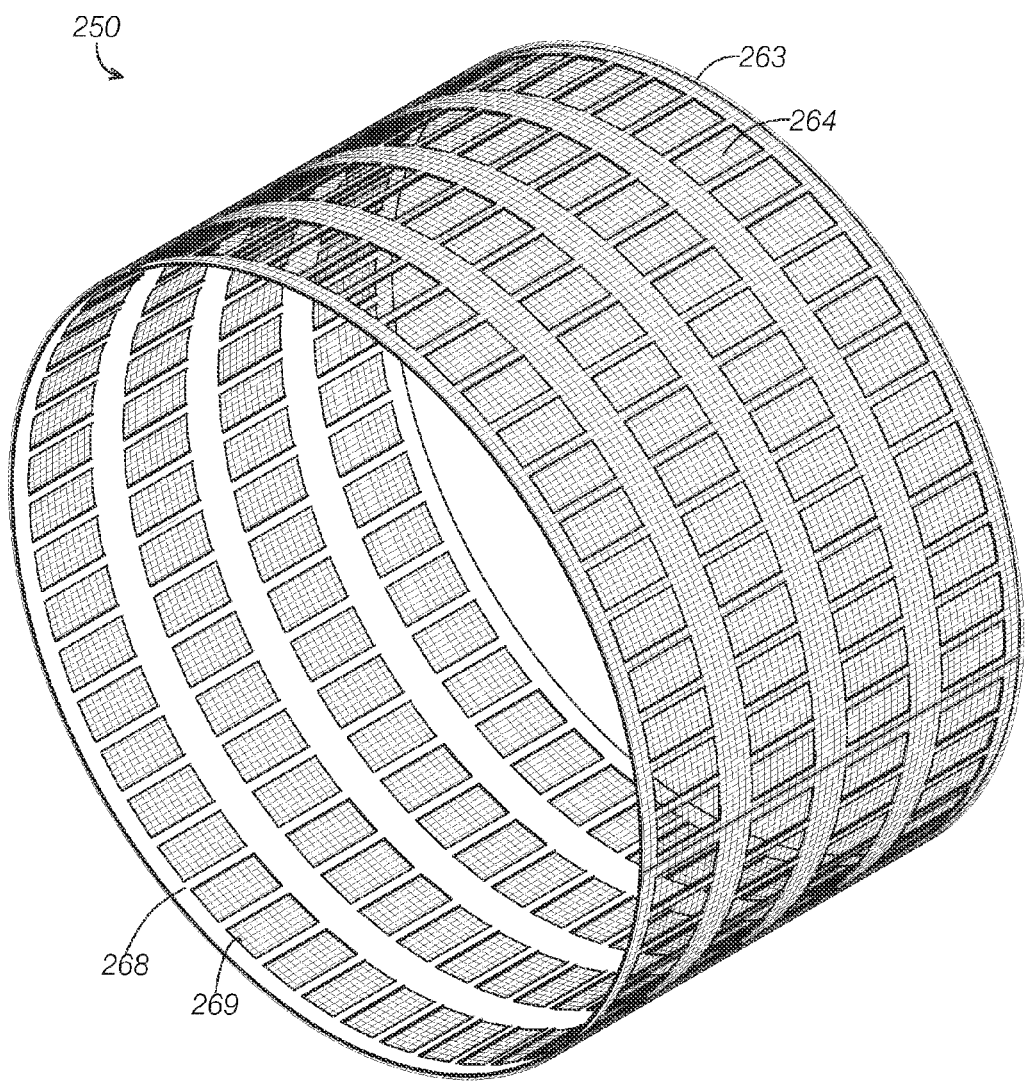
FIG. 6 is a perspective view of a second example of a plant material container configured to be interchangeably connected to the post-harvest plant matter processing device of FIG. 1.

Some plant material container examples, such as harvesting container 250 shown in FIG. 6, may include a fine mesh layer, such as fine harvesting container mesh 263. Fine mesh layer 263 can be additionally or alternatively used with a coarse mesh layer, such as coarse harvesting container mesh 268. fine harvesting container mesh 263 is installed as an additional layer around the exterior of coarse harvesting container mesh 268.

As FIG. 6 illustrates, fine harvesting container mesh 263 defines a plurality of fine openings 264 that are smaller than plant material container openings 158. coarse harvesting container mesh 268 includes a plurality of coarse openings 269, which are larger than plant material container openings 158 (and, by extension, substantially larger than fine openings 264). Accordingly, fine harvesting container mesh 263's solid areas are substantially thinner than solid areas of coarse harvesting container mesh 168's.

The configuration of harvesting container 250 may be useful in "grinding" plant material into more fine particulate matter, which may be useful in creating a dense, concentrated powder of the plant material in operations where it is desirable to collect particulate matter. Some plant material container examples may include only a fine mesh layer substantially similar to fine harvesting container mesh 263. Including both layers, however, may increase efficacy in grinding plant material.

For example, the metal portions of the coarse mesh may, at times, deflect plant material within the plant material container's processing space, thereby increasing the velocity with which plant matter will hit the fine mesh or adjusting the angle with which plant material hits the fine mesh. Increasing the velocity of the plant matter may increase the shearing force the fine mesh applies to the plant material as compared to an example including only a fine mesh layer. Further, some examples implementing a fine mesh may forgo the use of the saddle, which may increase the efficiency in which yielded particulate matter is accumulated. Some examples may allow the saddle fasteners to be removed to detach saddles from cases for use of the fine mesh layer plant material chamber without the saddle.

As described above, when mechanically connected, motor 130 is configured to rotationally drive plant material container 150 within saddle 170 around plant material container 150's central longitudinal axis. As motor 130 rotationally drives plant material container 150, plant material container 150 may travel through one or more post-harvest processing positions (i.e., post-harvest processing points) where at least one plant material container opening 158 at least partially overlaps a saddle opening 180. FIG. 5 provides a detailed view of one such post-harvest processing position, processing position 102.

As FIG. 5 illustrates, at processing position 102, first container opening lateral edge 159 and first saddle opening lateral edge 184 of the associated overlapped plant material container opening 158 and saddle opening 180 are misaligned with one another by a predetermined trimming angle 104. Predetermined trimming angle 104 has been selected to roughly translate to the angle of a pair of trimming shears, such as a scissors, that has been found to be particularly successful in trimming plant material. Accordingly, overlapping lateral edges of openings of the plant material container and the saddle are configured to act as trimming scissors on the plant material as they slidingly move over each other during operation of the device (i.e., rotation of the plant material container within the saddle).

It will be appreciated that trimming angles ranging of 9.5 degrees to 10 degrees have been found to be particularly successful in trimming plant material, particularly with regard to trimming hops or other plants that produce harvestable buds or flowers. Disclosed examples are not, however limited to this range. Indeed, different angles may be more appropriate for other example plant materials.

As FIGS. 1 and 5 show, the first lateral edges of each saddle and plant material container opening define a substantially uniform trimming angle at each processing position. It will be further appreciated that this uniformity may help produce a more uniform desired plant material portion, but in other examples the device can include non-uniform trimming angles.

Returning to FIG. 2, control panel 190 is positioned on first side panel 112ii and includes wiring (not shown) placing it in electrical communication with power cable 132 and motor 130. control panel 190 includes an on button 191, an off button 192, a timed harvest button 193, and a timer 194. Control panel 190 is configured to receive user input and send electrical signals, via a control panel wire 199, to adjust motor 130 between an operating state wherein the motor automatically drives plant material container 150 and an idle state wherein the motor is substantially stationary in response to received user input. Control panel 190 can be powered by power cable 132 or, in some examples, by motor 130 by way of an inverter.

Control panel 190 is configured to communicate electric signals to motor 130 adjust its behavior. For example, on button 191 may communicate a signal to adjust motor 130 to an operating state in response to user selection. This may be useful, of course, for users in order to begin post-harvest processing of plant material contained within post-harvest processing space 155. off button 192 may communicate a signal to adjust motor 130 to an idle state in response to user selection. This may be useful, of course, for users to stop post-harvest processing of plant material contained within post-harvest processing space 155.

Also depicted in FIG. 2, timer 194 includes a display 195, an add time button 196, and a remove time button 197. Users may adjust a user-selected segment of time by selecting add time button 196 and remove time button 197. In many examples, add time button 196 will add a pre-determined increment of time, such as a minute, to the user-selected segment of time, whereas remove time button 197 will remove the same increment of time from the user-selected segment of time. At any given time, display 195 reflects the current user-selected segment of time.

Timed harvest button 193 is configured to communicate a signal or signals to maintain motor 130 in an operating state (i.e., a state where plant material container 150 is rotating) for the user-selected segment of time entered into timer 194. As device 100 performs a timed post-harvest processing operation in response to selecting timed harvest button 193, the user-selected segment of time will be appropriately reduced and displayed during the operation. Users may lengthen or shorten the user-selected segment of time, and thus the remaining duration of the timed post-harvest processing operation, by selecting add time button 196 or remove time button 197.

control panel 190 additionally includes an intensity adjustment 198, which allows users to adjust the speed at which plant material container 150 rotates within saddle 170 by communicating an electric signal to motor 130 to either increase or decrease its rotations per minute.

Figure 7:
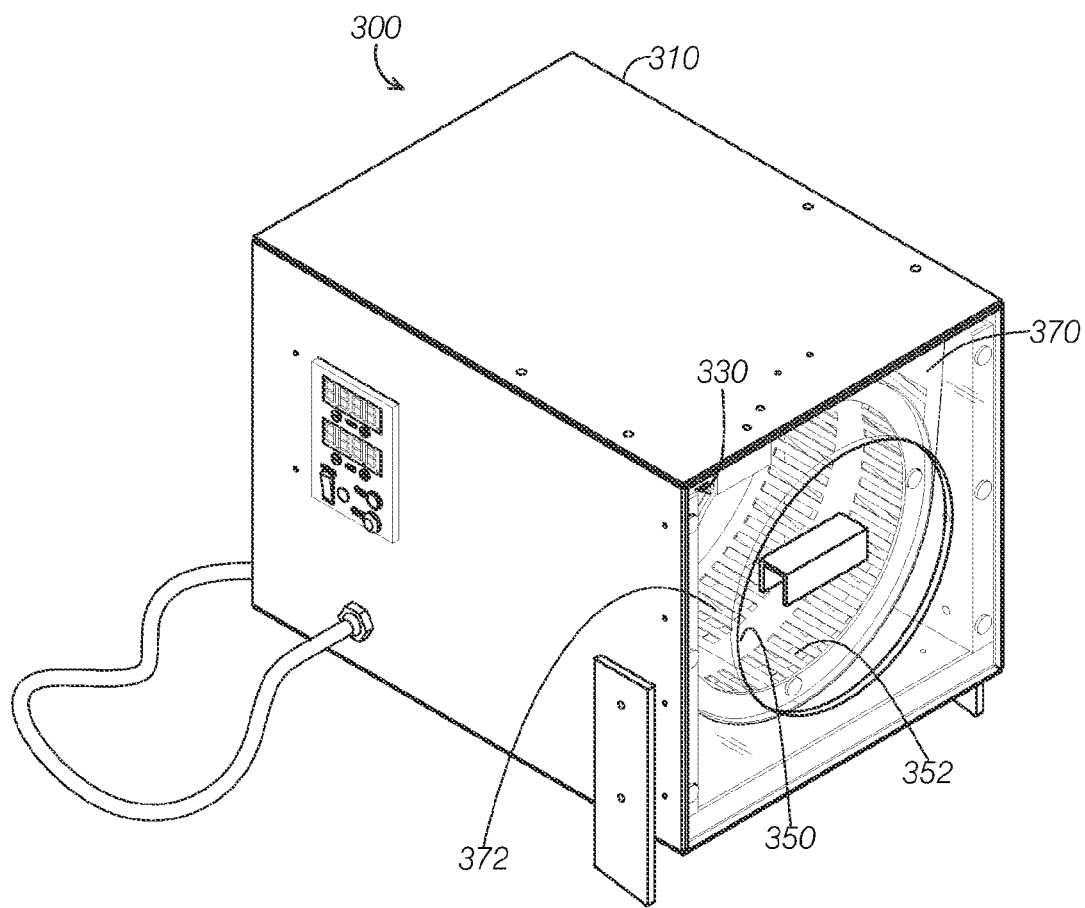
FIG. 7 illustrates a second example of a mechanical post-harvest plant matter processing device.

With reference to FIG. 7, a second example of a mechanical post-harvest plant matter processing device, device 300, will now be described. As FIG. 7 illustrates, device 300 is substantially similar in design to device 100. Indeed, device 300 includes a case 310, a saddle 370, a harvesting container 350, and a motor 330, each substantially similar in design to case 110, saddle 170, plant material container 150, and motor 130, respectively. Each of these components, while similar in design, are significantly reduced in dimension. Device 300 is not merely a smaller version of device 100, however, as saddle 370 and harvesting container 350 include both saddle openings 372 and plant material container openings 352 that are substantially the same size as saddle openings 180 and plant material container openings 158, respectively.

As a result, device 300 provides a similar efficacy as device 100. Device 300's smaller design makes the device more practical and accessible for individuals and home users. Further, device 300 is considerably more portable, allowing users to easily transport device 300 to areas where plant material is stored and/or harvested. Indeed, this disclosure specifically contemplates smaller devices that are battery powered, which provide a greater degree of portability. Indeed, smaller devices, such as device 300, may even be transported to the place where plant material is grown to complete on-site post-harvest processing.

In summary, either of devices 100 and 300 can be used for post-harvest processing of plant material in order to separate and/or fractionate a desired portion of plant material from an undesired portion of plant material. As described above, the post-harvest processing devices provide a one-step operation for post-harvest processing. Namely, a user can remove the case access cover and the plant material container access opening cover in order to open the device at the location of the open panel. Removal is carried out by overcoming the magnetic pairing of magnetically attractable elements on the case and the covers. The user can then insert plant material into the inner space of the plant material container (i.e., the post-harvest processing space). While the case access cover is removed and safety device pin is in an extended position, the device is prevented from operation by the safety device.

After the plant material container access opening cover and the case access cover are reattached (i.e., magnetically paired with the case), the safety device pin is moved into a depressed position within the safety control box and the device is then operable. The control panel is configured to receive commands from the user to designate a duration and a speed of operation, as well as start and stop commands. After receiving user commands for operation, the motor and the drive shaft then drive rotation of the plant material container within plant material container-proximate region of the saddle. In some examples, a low-friction material on either or both of the outer surface of the plant material container and an inner surface of the saddle reduces friction during rotation of the plant material container, and thereby reduces a risk of heat ignition of particulate plant matter.

Rotation of the plant material container within the saddle cyclically and automatically carries out post-harvest processing of the plant material. In one specific example, where the plant material chamber includes a course mesh, the course mesh is configured to retain and/or trap an undesired portion of the plant material (e.g., leaves, stems, etc.) in the course mesh, while a desired portion of the plant material (e.g., budding portions, etc.) is retained within the post-harvest processing space. During operation of the device, openings of the plant material chamber overlap with openings of the saddle (i.e., interfacially engage) and slidingly move past each other during rotation of the plant material chamber and the plant material is repeatedly deflected within the plant material chamber. The openings are particularly angled to mimic the action of trimming shears and remove leaves (i.e., an undesired portion of the plant material) from the budding portions (i.e., a desired portion of the plant material). Particulate plant matter can be collected in the tray of the bottom portion and/or directed to a disposal area via the duct attached to the case.

In another specific example, where the plant material chamber includes a fine mesh, the fine mesh is configured to substantially grind the plant material into a particulate matter. It will be appreciated that in this example the desired portion of the plant is the particulate matter. In this example, the particulate matter may be retained within the plant material chamber and/or the particulate matter can be collected in the tray of the bottom portion. Further, the tray can be removed and particulate matter collected by the user.

In both examples, the device can automatically stop by completing the duration of processing input by the user. Alternatively, the user can command a stop via the control panel or by removal of the case access cover. After removal of the case access cover and the plant material container access opening cover, the user can collect desired plant material from within the plant material processing space and/or the plant material chamber can be removed from the case to collect desired plant material from the plant material processing space. It will be appreciated that alternative plant material chambers can be used interchangeably with the device as desired in order to carry out various post-harvest processing procedures (e.g., trimming, grinding, etc.) and/or to optimize for processing various types of plant material (e.g., plant material having various size of stems, leaves, etc.).

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A mechanical device for separating plant material, the mechanical device comprising:
   a stationary saddle comprising:
      a surface bounded by a first lateral edge, a second lateral edge, a front end and a rear end;
      a plant material container-proximate region over at least a portion of said surface;
      said surface having a U-shaped cross-section with a vertex;
      wherein the plant material container-proximate region is extended over the vertex; and
      a plurality of saddle openings are disposed within the plant material container-proximate region;
   a plant material container comprising a rotatable drum for receiving plant material, said drum having an exterior curved surface; and
      a plurality of plant material container openings disposed in the exterior curved surface of the plant material container; and a rotary actuator mechanically connected to the plant material container, the rotary actuator configured to rotationally drive the plant material container such that the plant material container rotates within the saddle over the vertex; and wherein a portion of the plant material container openings and a portion of the saddle openings overlap at one or more positions during rotation of the plant material container.

2. The device of claim 1, wherein the plant material container has a substantially open intake end.

3. The device of claim 2, wherein the saddle:
has a thickness with a first exterior face and an opposite exterior face, and said saddle openings pass through the thickness from the first exterior face to the opposite exterior face;
defines a parabolic shape that includes a substantially parabolic cross-section taken transverse to a longitudinal axis of the saddle; and
defines a saddle curvature over substantially all of the plant material container-proximate region, the plant material container defining a continuous curvature complimentarily configured to the saddle curvature to fit within the saddle curvature; and
partially encloses a saddle-interior space.

4. The device of claim 3, wherein the plant material container openings define a plant material container mesh over a surface area of the plant material container; and
the plant material container openings are equally spaced, each of the plant material container openings defining a substantially linear first container opening lateral edge and a substantially linear second container opening lateral edge that is substantially parallel to the first container opening lateral edge.

5. The device of claim 4, wherein the saddle openings define a saddle mesh in the surface of the plant material container-proximate region, each of the saddle openings having a substantially linear first saddle opening lateral edge and a substantially linear second saddle opening lateral edge that is substantially parallel to the first saddle opening lateral edge; and
the first container opening lateral edge is misaligned with the first saddle opening lateral edge of a partially overlapping saddle opening at a predetermined trimming angle.

6. The device of claim 5, wherein the predetermined trimming angle is selected from a range of 9.5 degrees to 10 degrees.

7. The device of claim 5, wherein: the plant material container openings are sized to allow a first portion of plant material to pass through said plant material container openings while a second portion of the plant material is retained within the plant material container and the saddle openings are sized to allow the first portion of the plant material to pass through said saddle openings.

8. The device of claim 2, further comprising a case having a top panel and enclosing an interior space of the device, the saddle and the plant material container being disposed within the interior space; said saddle having saddle attachment points on the first lateral edge and the second lateral edge; and said top panel having corresponding saddle fastener receivers to which said saddle attachment points are selectively attachable by saddle fasteners.

9. The device of claim 8, wherein:
the plant material container defines a plant material container access opening on the intake end of the plant material container, the case defining a case access opening overlapping at least a portion of the plant material container access opening; and
the device further comprises a rigid, translucent case access cover removably attachable to the case to cover at least a portion of the case access opening and a safety device attached to the case, the safety device configured to detect removal of the case access cover and being in electric communication with the rotary actuator and configured to communicate a signal to the rotary actuator to cease operation in response to removal of the case access cover, the safety device including an outwardly biased safety device pin configured to be from an extended position to a depressed position by the case access cover when the case access cover is attached to the case.

10. The device of claim 8, wherein:
the plant material container defines a plant material container access opening on the intake end of the plant material container;
the case includes a case access cover retaining member projecting into the interior space, the case access cover retaining member having one or more outwardly facing case magnetically attractable elements the case access cover including one or more case access cover magnetically attractable elements configured to be operatively paired with the one or more case magnetically attractable elements to retain the case access cover in a fitted position in the case access opening; and
the device further comprises a rigid, substantially translucent plant material container cover removably attachable to the plant material container at the plant material container access opening to substantially cover plant material container access opening.

11. The device of claim 8, wherein the case defines a duct opening; and the device further comprises:
a duct connected to the duct opening, the duct defining a substantially enclosed fluid- and solid particulate-transmissive path extending between the interior space of the case and a disposal area; and a fluid pump attached to the duct configured to direct fluid and solid particulate matter from the interior space to the disposal area.

12. The device of claim 8, wherein the case further comprises a tray slidingly supported below the plant material container and the saddle, the tray being slidable between an accumulating position substantially fully received within the case and a dispensing position substantially outside the case.

13. The device of claim 2, further comprising a low-friction material on the exterior surface of the plant material container, the plant material container contacting the saddle over at least a portion of the plant material container-proximate region.

14. The device of claim 1, wherein the rotary actuator defines an electrically powered motor; and
the device further comprises a power cable configured to electrically couple the motor to a power source.

15. The device of claim 14, further comprising a control panel in electrical communication with the motor, the control panel configured to send user input to the motor to adjust the motor between an operating state wherein the motor automatically and continuously rotationally drives the plant material container and an idle state wherein the motor is substantially stationary.

16. A mechanical device for separating plant material, the mechanical device comprising:
a saddle defining:

a surface bounded by a first lateral edge, a second lateral edge, a front end and a rear end;
  a plant material container-proximate region over at least a portion of said surface;
  said surface having a U-shaped cross-section with a vertex;
  wherein the plant material container-proximate region is extended over the vertex; and
  one or more saddle openings disposed within the plant material container-proximate region;
a plant material container defining:
  an exterior surface of the plant material container proximate the saddle over at least a portion of the plant material container-proximate region, the exterior surface circumferentially enclosing a trimming space; and an interior surface of the plant material container shaped as to substantially isolate the desired portion of plant material in the trimming space; and
a mechanical actuator interchangeably mechanically attached to the plant material container, the mechanical actuator configured to rotationally drive the plant material container.

17. The device of claim 16, wherein the plant material container further comprises one or more plant material container openings positioned to overlap with at least a portion of the one or more saddle openings during rotation of the plant material container.

18. The device of claim 16, wherein:
the mechanical actuator includes a plant material container retaining member, the mechanical actuator configured to rotationally drive the plant material container retaining member;
the plant material container defines a plant material container back panel on an interior end of the plant material container, the plant material container back panel defining a back panel opening sized and shaped to receive the plant material container retaining member; and
the device further comprises a fastener attachable to the plant material container retaining member to retain the plant material container in a substantially fixed longitudinal position on the plant material container retaining member.

19. A mechanical device for separating plant material, the mechanical device comprising:
a saddle defining:
  a plant material container-proximate region over a portion of the surface area of the saddle; and
  one or more saddle openings disposed within the plant material container-proximate region;
a plant material container defining:
an exterior surface in direct contact with the saddle openings, the exterior surface circumferentially enclosing a trimming space; and
a coarse mesh disposed on the plant material container; and
a rotary actuator mechanically attached to the plant material container, the rotary actuator configured to rotationally drive the plant material container through a range of rotation,
wherein a portion of the coarse mesh and a portion of the one or more saddle openings overlap during rotation of the plant material container.

20. The device of claim 19, wherein: the coarse mesh defines one or more plant material container openings and further comprising a low-friction material on either the exterior surface of the plant material container or the plant material container-proximate region of the saddle.

* * * * *